US012811383B2

(12) United States Patent
Krämer et al.

(10) Patent No.: US 12,811,383 B2
(45) Date of Patent: Nov. 24, 2026

(54) BUSBAR ARRANGEMENT, IN PARTICULAR FOR ELECTRICAL, MULTIPOLAR HIGH-CURRENT CONNECTION IN AN ELECTRICALLY DRIVEN MOTOR VEHICLE

(71) Applicant: Preh GmbH, Bad Neustadt a.d. Saale (DE)

(72) Inventors: Julian Krämer, Würzburg (DE); Frederik Püschel, Salz (DE); Volker Rüdiger Reuss, Heustreu (DE); Stefan Werner Gellert, Walkertshofen (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 187 days.

(21) Appl. No.: 18/692,707

(22) PCT Filed: Sep. 1, 2022

(86) PCT No.: PCT/EP2022/074316

§ 371 (c)(1),
(2) Date: Mar. 15, 2024

(87) PCT Pub. No.: WO2023/041341

PCT Pub. Date: Mar. 23, 2023

(65) Prior Publication Data

US 2024/0291258 A1 Aug. 29, 2024

(30) Foreign Application Priority Data

Sep. 15, 2021 (DE) ..................... 10 2021 123 913.3

(51) Int. Cl.
*H02G 5/02* (2006.01)
*H02G 5/10* (2006.01)

(52) U.S. Cl.
CPC ............... *H02G 5/025* (2013.01); *H02G 5/10* (2013.01)

(58) Field of Classification Search
CPC ............................... H02G 5/005; H02G 5/025
See application file for complete search history.

(56) References Cited

U.S. PATENT DOCUMENTS 2,963,537 A * 12/1960 Carlson .................... H02G 5/06
439/212
3,909,098 A 9/1975 Reed et al.
(Continued)

FOREIGN PATENT DOCUMENTS

AT 366854 B 5/1982
CN 102255162 A 11/2011
(Continued)

OTHER PUBLICATIONS

International Search Report for PCT/EP2022/074316, dated Nov. 29, 2022. Searching Authority European Patent Office, Rijswijk, Netherlands.

(Continued)

*Primary Examiner* — Chau N Nguyen
(74) *Attorney, Agent, or Firm* — M&B IP Analysts, LLC

(57) ABSTRACT

The present disclosure relates to a busbar arrangement for electrical multipolar high-current connection in an electrically driven motor vehicle. The busbar arrangement includes a plurality of essentially planar supports formed of an electrically insulating material which are stacked in a stacking direction, each of which forms one or more trough-shaped receptacles which are open on one side; a plurality of busbars formed of a metal or of a metal alloy, each of which is accommodated in one of the trough-shaped receptacles; wherein at least one support of a plurality of essentially planar supports comprises a contact surface for a respective busbar, and thus a base forming a trough base of the trough-shaped receptacle and, for each trough-shaped receptacle, a first flange which circumferentially encloses the
(Continued)

respective busbar and forms a side wall of the trough-shaped receptacle.

10 Claims, 3 Drawing Sheets

(56) References Cited

U.S. PATENT DOCUMENTS

| | | | | |
|---|---|---|---|---|
| 7,819,681 | B1 | 10/2010 | Rodrigues et al. | |
| 8,378,219 | B2 * | 2/2013 | Lesieur | H02G 5/007 174/70 B |
| 9,281,674 | B2 * | 3/2016 | Walgenbach | H02G 5/06 |
| 9,893,646 | B2 | 2/2018 | Rowden et al. | |
| 2005/0026014 | A1 * | 2/2005 | Fogaing | H01M 10/0565 429/437 |
| 2020/0280153 | A1 | 9/2020 | Yanagida et al. | |
| 2021/0218237 | A1 * | 7/2021 | Dube | H02G 5/10 |
| 2022/0216724 | A1 * | 7/2022 | Ishitobi | H01R 25/16 |
| 2023/0060247 | A1 * | 3/2023 | Han | H01M 50/209 |
| 2024/0055847 | A1 * | 2/2024 | Decker | H02G 5/066 |

FOREIGN PATENT DOCUMENTS

| | | | |
|---|---|---|---|
| DE | 10159401 | A1 | 6/2003 |
| DE | 102010050654 | A1 | 5/2012 |
| DE | 102019101973 | A1 | 7/2020 |
| DE | 102019134469 | A1 | 7/2020 |
| DE | 102019214218 | A1 | 3/2021 |
| EP | 3667844 | A2 | 6/2020 |

OTHER PUBLICATIONS

Office action for DE 10 2011 291 3.3, dated Jul. 15, 2022. German Patent and Trademark Office, Munich, Germany.

Written Opinion of the Searching Authority for PCT/EP2022/074316, dated Nov. 29, 2022. Searching Authority European Patent Office, Rijswijk, Netherlands.

* cited by examiner

BUSBAR ARRANGEMENT, IN PARTICULAR FOR ELECTRICAL, MULTIPOLAR HIGH-CURRENT CONNECTION IN AN ELECTRICALLY DRIVEN MOTOR VEHICLE

The present disclosure relates to a busbar arrangement, in particular for electrical multi-polar high-current connection in an electrically driven motor vehicle. Busbar arrangements, particularly in electrically driven motor vehicles, are subject to various requirements. On the one hand, they must have the requisite current-carrying capacity, which is constantly increasing in response to the expanding capacity of electric motor drive systems and the increasing charging power of the traction battery or the charging infrastructure. Moreover, on the grounds of unavoidable ohmic losses, measures are frequently required for the evacuation of heat from current-carrying components of the busbar arrangement. In order to provide as much space as possible for the traction battery, thus permitting the delivery of a high electrical capacity, it is also endeavored to achieve a high integration density. This handicaps compliance with the requisite clearances and creepage distances between busbars which are energized at different electrical potentials, which compliance becomes more structurally complex as the charging potential and the traction battery potential increases. It is known, for example from DE 10 2019 214 218 A1, for busbars to be embedded in plastic. On the grounds of the differing coefficients of thermal expansion of components employed, this solution is comparatively complex. It is further known, for example from CN 102255162 A1, for a multipolar busbar arrangement to be produced by lamination. As the laminated region of these busbars can only be configured with a planar design, complex busbar profiles are not achievable. Moreover, structures of this type generally lack sufficient mechanical stability, which is necessary in an electric motor vehicle, not only during driving but also in the event of an accident.

In this context, a need has arisen for a busbar arrangement, in particular for electrical multipolar high-current connection in an electrically driven motor vehicle, which has a high integration density, which permits comparatively complex busbar profiles whilst maintaining compliance with minimum distances for stipulated clearances and creepage distances, and which moreover assumes sufficient and long-term mechanical stability. This object is fulfilled by a busbar arrangement as presently disclosed in claim 1. An equally advantageous application is the subject matter of the sub-claim. Advantageous configurations are the respective subject matter of the dependent claims. It should be observed that individual features described in the present disclosure can be mutually combined in an arbitrary and technologically appropriate manner, thereby disclosing further configurations of the present disclosure. The present disclosure is further characterized and specified by the description, particularly in conjunction with the figures.

The present disclosure relates to a busbar arrangement, in particular for electrical multipolar high-current connection in an electrically driven vehicle, for example between the traction battery and the electric drive motor and/or between a charging infrastructure which is located externally to the motor vehicle and the traction battery. The busbar arrangement according to the present disclosure includes a plurality of essentially planar supports formed of an electrically insulating material which are stacked in a stacking direction, each of which forms one or more trough-shaped receptacles which are open on one side. According to the present disclosure, a plurality of busbars are provided, formed of a metal, such as copper, or of a metal alloy, each of which is accommodated in one of the receptacles. Preferably in at least one support, and preferably in all the supports of the busbar arrangement, a plurality of busbars are respectively accommodated in each associated receptacle. Preferably, the plurality of busbars which are provided for each support are mutually electrically insulated.

According to the present disclosure, at least one support, and preferably all the supports, include a contact surface for the respective busbar, and thus a base forming a trough base of the trough-shaped receptacle and, for each receptacle, a first flange which circumferentially encloses the respective busbar and forms a side wall of the trough-shaped receptacle, in order define an associated clearance and creepage distance to the support, which is formed of an electrically insulating material. The flange preferably encloses the narrow sides of the respectively accommodated busbar. The electrically insulating material, for example, is a plastic, such as a thermoplastic. The support is produced, for example, by a thermal forming process, such as an injection-molding process. The support can be configured with a one-piece or multi-piece design. For example, the support is configured with a one-piece design, and includes an integral unit formed of the base and the one or more first flanges which extend upwards from the base. Each of the busbars is preferably accommodated in the respective receptacle in an adhesive-free arrangement. The busbars are preferably accommodated in the trough-shaped receptacle in a form-fitted and/or interference-fitted manner. By means of the solution according to the present disclosure, a busbar arrangement is provided, in particular for electrical multipolar high-current connection in an electrically driven motor vehicle, which assumes a high integration density, which permits comparatively complex busbar profiles whilst maintaining compliance with stipulated minimum distances for clearances and creepage distances, and which moreover provides sufficient and long-term mechanical stability. The core element of the busbar arrangement according to the present disclosure is the combination and functional integration of various requirements in the most compact structural arrangement possible. For example, the busbars are stamped from a single sheet of metal, and are then electrically insulated from one another by means of the supports. A compact design is thus achieved, which thermally approximates to a cool connection and thus features short transmission paths which, in turn, result in a compact structure and a reduction in the constituent material of copper busbars. Moreover, as a result of the mutual proximity of busbars, a form of heat dissipation and transmission to inactive busbars/regions can occur, thereby exploiting the good thermal conductivity of the busbar material, for example in the formation of the widest surface connection possible to a heat sink, such as a cooling duct.

At least one support preferably includes a second flange which projects in the direction of the immediately adjoining support and which, in combination with the first flange of the immediately adjoining support, forms a labyrinth-shaped creepage distance and/or clearance between two busbars which are accommodated in the immediately adjoining support. By means of the thus elongated labyrinth-shaped clearance, tracking resistance is enhanced, spacing between busbars in the immediately adjoining support can be reduced, thus saving structural space, and heat dissipation between the thus more closely adjoining busbars can moreover be improved. For example, the second flange is configured and arranged to engage in the clear gap between two first flanges of the immediately adjoining support and between two busbars of the immediately adjoining support, without touching said immediately adjoining support.

In each case, the support preferably includes one or more trough-shaped receptacles on the side of only one of its two main surfaces, i.e. in a one-sided arrangement. For example, the second flange projects upwards from the side of the base which is averted from the receptacle or receptacles, which is the receptacle-free base surface of the support base.

The openings of all the trough-shaped receptacles are preferably commonly aligned in the stacking direction. For example, all the receptacles of the busbar arrangement open in a direction which is averted from a heatsink, wherein the heatsink is arranged contiguously to the receptacle-free base surface of the base of an outer support.

According to a preferred configuration of the busbar arrangement according to the present disclosure, at least one outer support of the busbar arrangement includes a base which is designed for thermally conductive coupling with a heatsink. For example, particles of a thermally conductive material are embedded in the material of the support, in particular exclusively in the base region of the support which forms the receptacle-free base surface.

The outer support preferably includes a framework which forms the first flange or first flanges, and an insulating foil which at least partially forms the base of the outer support. Efficient evacuation of heat from the busbar(s) which is (are) accommodated in the outer support is achieved accordingly. For example, the insulating foil includes a thermoplastic foil substrate. The term "insulating foil" refers exclusively to the electrical insulating property of foil, and not necessarily, or at least only negligibly to any thermal insulating property. The material and thickness of the insulating foil of the outer support are preferably selected such that the thermal conductivity thereof in the stacking direction is superior to that of the base of all the other supports.

An outer support is preferably the support having the largest external dimensions.

A framework is understood as a support which incorporates penetrations. For example, a penetration is provided for each receptacle, the outer edge of which is oriented with a parallel offset to the first flange, and thus forms a bearing edge by way of a contact surface of the base for the busbar, whereas the insulating foil closes the penetration and at least partially forms the base of the support, and thus of the associated receptacle or receptacles.

A silicone-based, polyurethane-based or acrylate-based, preferably elastomer liner incorporating a ceramic filler, such as aluminum oxide, zinc oxide and/or boron nitride, is preferably arranged between the insulating foil and the relevant busbar. Liners of this type are commercially available under the trade name "GAP PAD®". The liner is preferably arranged to fill the gap formed by the bearing edge between the busbar and the insulating foil, thus executing the bridging thereof in a thermally conductive manner, in comparison with an air gap.

For example, at least two busbars of the plurality of busbars which are arranged in immediately adjoining supports are connected by interference fitting in an electrically conductive manner, for example by a riveted connection or screw connection. Preferably, all the busbars in the busbar arrangement are arranged in a mutually electrically insulated manner.

At least one support preferably includes a penetration for an electric contact pin for the electrical contact-connection of the busbar arrangement and for the outfeed or infeed of an electric current. The term "contact pin" is to be interpreted broadly.

Each of the busbars is preferably configured as a stamping or as a stamped and embossed part, for example of sheet metal.

Preferably at least one busbar, within the profile thereof which is arranged in the relevant trough-shaped receptacle, incorporates a socket section for the fitting of an electrical contact element. The socket section, for example, is designed for the establishment of an interference-fitted electrical connection, such as a screw connection or a riveted connection to a connecting part, such as a contact pin. The socket section is introduced into the busbar, for example by embossing.

According to a preferred configuration of the busbar arrangement, the latter further includes a heatsink, such as a heat-exchanger or a cooling element for convection cooling, wherein the heatsink is arranged contiguously to an outer support of the plurality of supports.

The present disclosure further relates to the application of the busbar arrangement, in one of the above-mentioned embodiments, in an electric motor-driven vehicle.

The various disclosed embodiments are described in greater detail with reference to the following figures. The figures are to be understood as exemplary only and, in each case, represent only one preferred variant of embodiment. In the figures.

Figure 1:
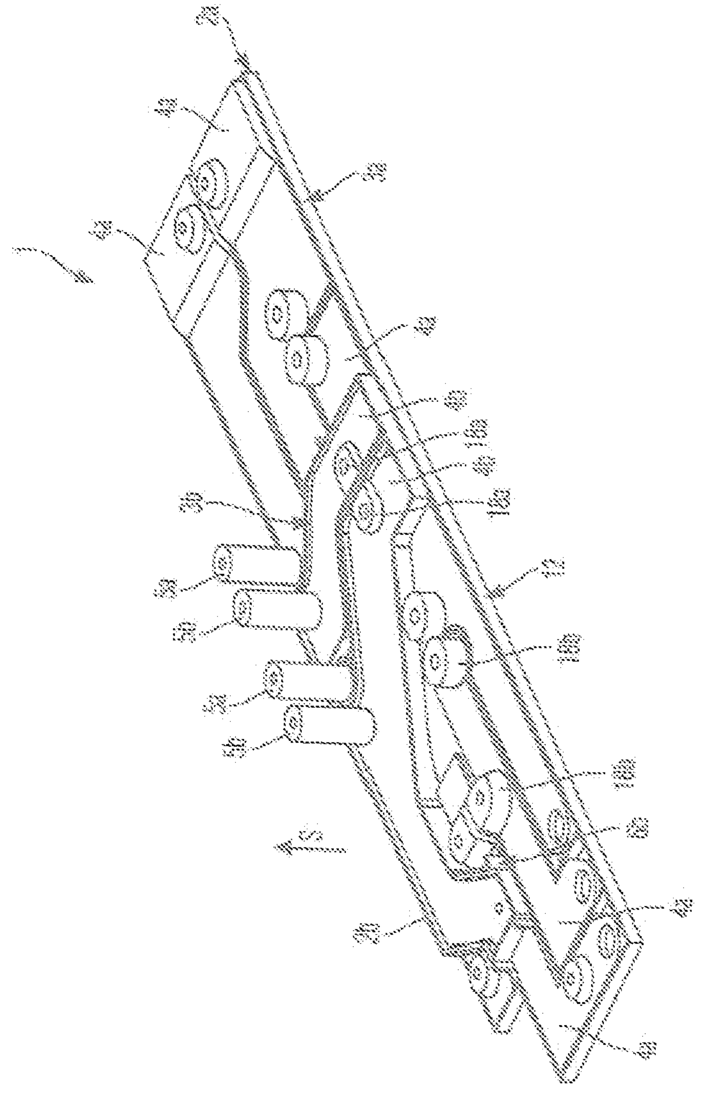
FIG. 1 shows a perspective view of one embodiment of the busbar arrangement 1 according to an embodiment.
Figure 2:
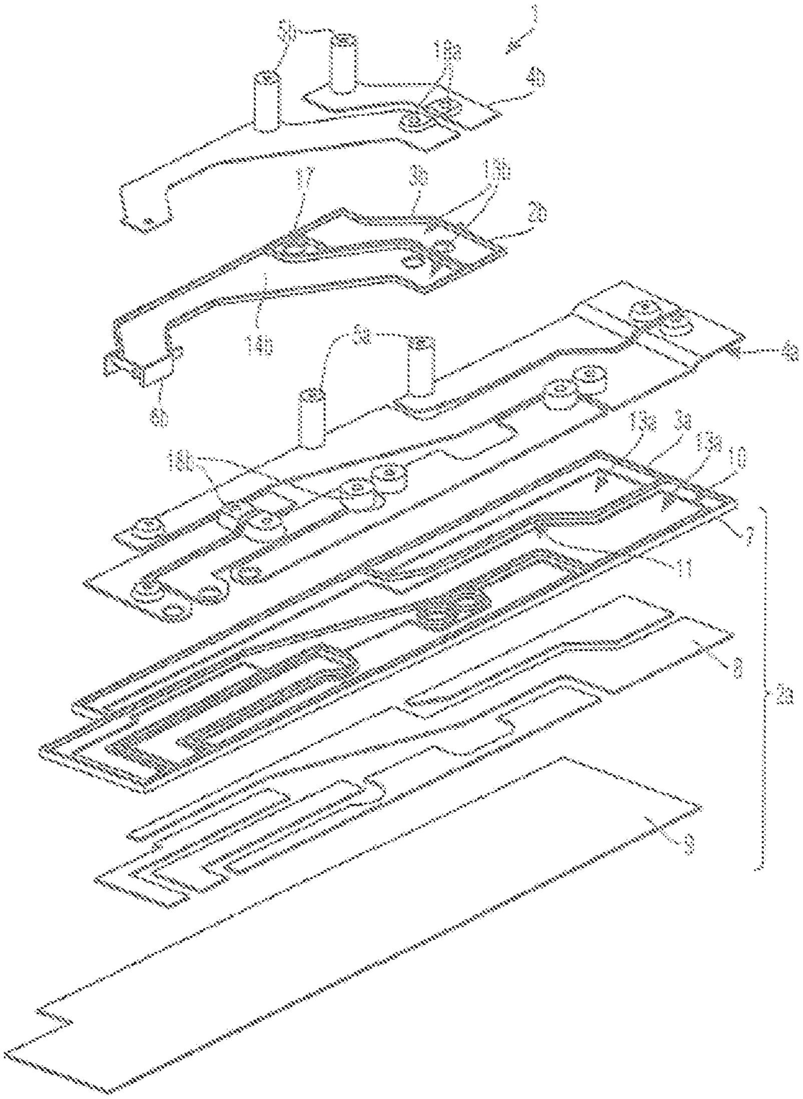
FIG. 2 shows an exploded perspective view of the embodiment of the busbar arrangement 1 according to an embodiment represented in FIG. 1.
Figure 3:
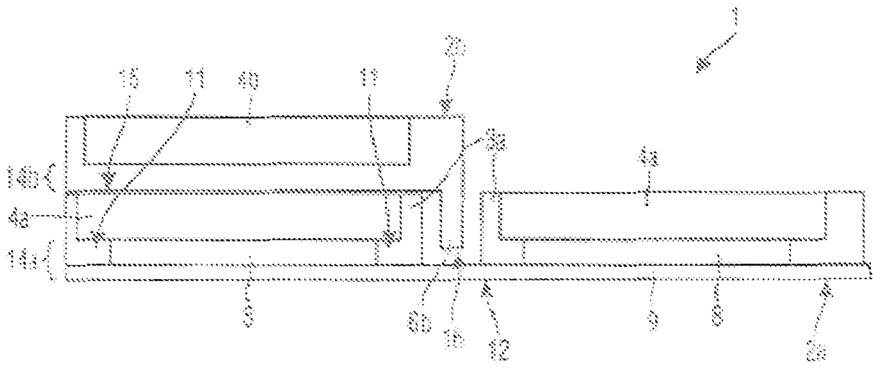
FIG. 3 shows a detailed sectional view of the busbar arrangement 1 represented in FIG. 1.

FIGS. 1, 2, and 3 show a busbar arrangement 1 for electrical multipolar high-current connection in an electrically driven motor vehicle, for example between the traction battery and the electric drive motor and/or between a charging structure which is located externally to the motor vehicle and the traction battery. The busbar arrangement 1 includes a plurality, in this case two essentially planar supports 2*a*, 2*b* formed of an electrically insulating material which are stacked in a stacking direction S, each of which forms a plurality of trough-shaped receptacles 13*a* or 13*b* which are open on one side. According to an embodiment, a plurality of busbars 4*a* or 4*b*, formed of a metal such as copper or of a metal alloy, and which are respectively arranged in one of the receptacles 13*a* or 13*b*, are provided. Each of the busbars 4*a*, 4*b* is configured as a stamping or as a stamped and embossed part of sheet metal. In all the supports 2*a*, 2*b* of the busbar arrangement 1, a plurality of busbars 4*a*, 4*b* are respectively accommodated in each associated receptacle 13*a*, 13*b*. In the embodiment represented, not only the relevant busbars 4*a*, 4*b* for each support 2*a*, 2*b* are mutually electrically insulated, but all the busbars 4*a*, 4*b* are mutually electrically insulated, at least within the busbar arrangement 1. All the busbars 4*a*, 4*b*, within the profile thereof which is arranged in the relevant trough-shaped receptacle 13*a*, 13*b*, form one or more socket sections 18*a*, 18*b* for the fitting of an electrical contact element. The socket section 18*a*, 18*b*, for example, is designed for the establishment of an interference-fitted electrical connection, such as a screw connection or a riveted connection to a connecting part, such as a contact pin 5*a*, 5*b*. The socket section 18*a*, 18*b* is introduced into the busbar 4*a*, 4*b*, for example by embossing.

All the supports 2*a*, 2*b* form a contact surface for the respective busbar 4*a*, 4*b*, and thus a base 14*a*, 14*b* (c.f. FIGS. 2 and 3) forming a trough base of the trough-shaped receptacle 13*a*, 13*b* and, for each receptacle 13*a*, 13*b*, a first flange 3*a*, 3*b* which circumferentially encloses the respective busbar 4*a*, 4*b* and forms a side wall of the trough-shaped receptacle, in order define an associated clearance and creepage distance to the support 2*a*, 2*b*, which is formed of an electrically insulating material. The flange 3*a*, 3*b* encloses the narrow sides of the respectively accommodated busbar 4*a*, 4*b* and, over the major part of its circumference, engages in a flush arrangement to the exposed surface of the busbar 4*a*, 4*b*. The electrically insulating material, for example, is but is not limited to, a plastic, such as a thermoplastic. The supports 2*a*, 2*b* are produced, for example, in whole or in part, by a thermal forming process, such as an injection-molding process. The embodiments represented includes both a one-piece support 2*b* and a multi-piece support 2*a*. The support 2*b* of smaller external dimensions is configured in a one-piece design, and includes an integral unit formed of the base 14*b* and the plurality of first flanges 3*b* which extend upwards from the base 14*b*. All the busbars 4*a*, 4*b* are respectively accommodated in the relevant receptacle 13*a*, 13*b* in an adhesive-free arrangement. In this case, all the supports 2*a*, 2*b* include the plurality of trough-shaped receptacles 13*a*, 13*b* on the side of one of their two main surfaces, i.e. in a one-sided arrangement. All the trough-shaped receptacles 13*a*, 13*b* open in a common alignment along the stacking direction S, and open in a direction which corresponds to the stacking direction, which is averted from an unrepresented heatsink and which, in a regulation fitting of the busbar arrangement 1, adjoins to a plane surface 12 of the outermost support 2*a* which is defined by the base 14*a*. In this case, the outer support 2*a* of the busbar arrangement 1 includes a base 14*a*, which is designed for thermally conductive coupling with a heatsink, and which includes a framework which forms the first flanges 3*a* and an insulating foil 9 which at least partially forms the base 14*a* of the outer support 2*a*. Efficient heat evacuation from the busbar or busbars 4*a* which are accommodated in the outer support 2*a* is achieved accordingly. The insulating foil 9 includes a thermoplastic foil substrate. The framework is understood as that part 7 of the support 2*a* which incorporates penetrations 10. A penetration 10 is provided for each receptacle 13*a*, the outer edge of which is oriented with a parallel offset to the first flange 3*a*, and thus forms a bearing edge 11 by way of a contact surface of the base 14*a* for the associated busbar 4*a*. The term "insulating foil" 9 refers exclusively to the electrical insulating property of foil, and not necessarily, or at least only negligibly to any thermal insulating property. Instead, the material and thickness of the insulating foil 9 of the outer support 2*a* are selected such that the thermal conductivity thereof in the stacking direction S is superior to that of the base 14*b* of all the other supports 2*b*.

In each case, a silicone-based, polyurethane-based or acrylate-based, preferably elastomer liner 8 incorporating a ceramic filler, such as aluminum oxide, zinc oxide and/or boron nitride, is preferably arranged between the insulating foil 9 and the relevant busbar 4*a*. Liners 8 of this type are commercially available under the trade name "GAP PAD®". In this case, the liner 8 is arranged to fill the gap formed by the bearing edge 11 or the penetration 10 between the busbar 4*a* and the insulating foil 9 in a form-fitted manner, thus executing the bridging thereof in a thermally conductive manner, for example in comparison with an air gap. As shown in FIGS. 2 and 3, the support 2*b* which is arranged above the outer support 2*a* in the stacking direction S includes a second flange 6*b* which projects in the direction of the immediately adjoining support 2*a* and which, in combination with the first flange 3*a* of the immediately adjoining support 2*a*, forms a labyrinth-shaped creepage distance and/or clearance 16 between two busbars 4*a* which are accommodated in the immediately adjoining support 2*a*. In this case, the second flange 6*b* projects upwards from the side 15 of the base 14*b* which is averted from the receptacle or receptacles 13*b*, which is the receptacle-free base surface of the base 14*b* of the support 2*b* which forms the flange 6*b*. The upper support 2*b* in the stacking direction S further includes a penetration 17 for an electric contact pin 5*a* for the electrical contact-connection of the busbar arrangement 1, and for the outfeed or infeed of an electric current.

By means of the solution according to the disclosed embodiments, a busbar arrangement 1 is provided, in particular for electrical multipolar high-current connection in an electrically driven motor vehicle, which has a high integration density, which permits comparatively complex busbar 4*a*, 4*b* profiles whilst maintaining compliance with minimum distances for stipulated clearances and creepage distances, and which moreover assumes sufficient and long-term mechanical stability.

What is claimed is:

1. A busbar arrangement for electrical multipolar high-current connection in an electrically driven motor vehicle, comprising:

a plurality of essentially planar supports, formed of an electrically insulating material, which are stacked in a stacking direction, each of which forms at least one trough-shaped receptacles which are open on one side; and a plurality of busbars formed of a metal or of a metal alloy, each of which is accommodated in one of the trough-shaped receptacles;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle;

wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent; and wherein at least a base of an outer support of a plurality of essentially planar supports of the busbar arrangement is configured for thermally conductive coupling with a heatsink.

2. The busbar arrangement according to claim 1, wherein the outer support comprises a framework which forms the first flange or first flanges, and an insulating foil which at least partially forms the base of the outer support.

3. The busbar arrangement according to claim 2, wherein a liner is arranged between the insulating foil and an associated busbar, and wherein the liner is any one of: silicone-based, polyurethane-based and acrylate-based.

4. The busbar arrangement according to claim 2, wherein a liner is arranged between the insulating foil and an associated busbar and wherein the liner is an elastomer liner incorporating a ceramic filler.

5. The busbar arrangement according to claim 4, wherein the ceramic filler is at least one of: aluminum oxide, zinc oxide, and boron nitride.

6. A busbar arrangement for electrical multipolar high-current connection in an electrically driven motor vehicle, comprising:

a plurality of essentially planar supports, formed of an electrically insulating material, which are stacked in a stacking direction, each of which forms at least one trough-shaped receptacles which are open on one side; and a plurality of busbars formed of a metal or of a metal alloy, each of which is accommodated in one of the trough-shaped receptacles;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle;

wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent; and wherein the at least one support comprises a penetration for an electric contact pin, which is connected in an electrically conductive manner to the busbar which is arranged in an immediately adjoining support.

7. A busbar arrangement for electrical multipolar high-current connection in an electrically driven motor vehicle, comprising:

a plurality of essentially planar supports, formed of an electrically insulating material, which are stacked in a stacking direction, each of which forms at least one trough-shaped receptacles which are open on one side; and a plurality of busbars formed of a metal or of a metal alloy, each of which is accommodated in one of the trough-shaped receptacles;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle;

wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent; and wherein at least one busbar of the plurality of busbars, within a profile thereof which is arranged in an associated trough-shaped receptacle, incorporates a socket section for fitting an electrical contact element.

8. A busbar arrangement for electrical multipolar high-current connection in an electrically driven motor vehicle, comprising:

a plurality of essentially planar supports, formed of an electrically insulating material, which are stacked in a stacking direction, each of which forms at least one trough-shaped receptacles which are open on one side;

a plurality of busbars formed of a metal or of a metal alloy, each of which is accommodated in one of the trough-shaped receptacles; and a heatsink which is arranged contiguously to an outer support of the plurality of supports;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle; and wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent.

9. A busbar arrangement for electrical multipolar high-current connection in an electrically driven motor vehicle, comprising:

a plurality of essentially planar supports, formed of an electrically insulating material, which are stacked in a stacking direction, each of which forms at least one trough-shaped receptacles which are open on one side; and a plurality of busbars formed of a metal or of a metal alloy, each of which is accommodated in one of the trough-shaped receptacles;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle;

wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent; and wherein each first flange encloses narrow sides of the respectively accommodated busbar and, over a major part of its circumference, engages in a flush arrangement to a surface of the bus bar opposite the respective trough base.

10. An electrical motor-driven vehicle comprising a busbar arrangement, wherein the busbar arrangement further comprises:

a plurality of essentially planar supports, formed of an electrically insulating material, which are stacked in a stacking direction, each of which forms one or more trough-shaped receptacles which are open on one side; and a plurality of busbars formed of a metal or of a metal alloy, each of which is accommodated in one of the trough-shaped receptacles;

wherein at least one support of the plurality of essentially planar supports comprises a contact surface for a respective busbar, and thus a base forming a trough base of the trough-shaped receptacle and, for each trough-shaped receptacle, a first flange which circumferentially encloses the respective busbar and forms a side wall of the trough-shaped receptacle;

wherein the at least one support comprises a second flange which projects in the direction of an immediately adjoining support and which, in combination with the first flange of the immediately adjoining support, so as to form an elongated labyrinth-shaped creepage distance and/or clearance between two busbars of the plurality of busbars which are accommodated in the immediately adjoining support, wherein the elongated labyrinth-shaped creepage distance and/or clearance provides for enhanced tracking resistance with respect to the second flange being absent; and wherein each first flange encloses narrow sides of the respectively accommodated busbar and, over a major part of its circumference, engages in a flush arrangement to a surface of the bus bar opposite the respective trough base.

* * * * *